United States Patent [19]

Schapp et al.

[11] Patent Number: 4,949,513
[45] Date of Patent: Aug. 21, 1990

[54] METHOD FOR THE PRECISION MACHINING OF PARTICULARLY HARDENED GEARS AND A TOOL SUITED THEREFOR

[75] Inventors: Udo Schapp, Wessling; Josef Lohrer, Munich, both of Fed. Rep. of Germany

[73] Assignee: Carl Hurth Maschinen- und Zahnradfabrik GmbH & Co., Munich, Fed. Rep. of Germany

[21] Appl. No.: 247,875

[22] Filed: Sep. 22, 1988

[30] Foreign Application Priority Data

Oct. 13, 1987 [DE] Fed. Rep. of Germany ....... 3734653

[51] Int. Cl.$^5$ .................. B24B 19/00; B24B 27/00
[52] U.S. Cl. ............................. 51/287; 51/52 R; 51/52 HB; 51/105 HB; 51/DIG. 1; 51/105 GG; 51/287
[58] Field of Search ........... 51/105 GG, 287, DIG. 1, 51/52 R, 52 HB, 105 HB

[56] References Cited

U.S. PATENT DOCUMENTS 4,650,378  3/1987  Zubler ............................ 51/52 HB

FOREIGN PATENT DOCUMENTS 1537877  1/1979  United Kingdom .
1547512  6/1979  United Kingdom .

OTHER PUBLICATIONS

German Paper, "Werkstatt und Betrieb", 118th Year (1985), No. 8, pp. 505 to 509.
German Book, "Hurth, Zahnradschaben", pp. 210/211.

Primary Examiner—Frederick R. Schmidt
Assistant Examiner—Jack Lavinder
Attorney, Agent, or Firm—Flynn, Thiel, Boutell, & Tanis

[57] ABSTRACT

A method for the precision working of tooth flanks of hardened workpiece gears (W) utilizing a gear-shaped or rack-shaped tool (T) suited therefor, the tooth flanks (5) of which tool (T) having an abrasive surface, for example a CBN-coating. If such a tool carries out a feed movement relative to the workpiece to be machined, which feed movement is directed perpendicularly to the common normal, however, not in direction of the workpiece axis (4) (i.e. a diagonal feed), then it is important to choose the tool width ($b_t$) in dependency from the method parameters, namely, $$b_T \geq b_w \left[ 2 \cdot \cos \phi - \frac{\sin \epsilon}{\sin (\epsilon + \phi)} \right].$$

2 Claims, 1 Drawing Sheet

METHOD FOR THE PRECISION MACHINING OF PARTICULARLY HARDENED GEARS AND A TOOL SUITED THEREFOR

FIELD OF THE INVENTION

The invention relates to a tool and a method of use of the tool for the precision working of tooth flanks on hardened workpiece gears.

BACKGROUND OF THE INVENTION

Such a method for the precision working of the tooth flanks of particularly hardened gears, in which the tool is moved parallel to the workpiece gear axis and a radial feed occurs intermittently thereto, is known from the German Paper "Werkstatt und Betrieb" 118th year (1985), No. 8, Pages 505 to 509. The longitudinal feed, however, demands machining time and should therefore be avoided.

In another known method, the tool is exclusively fed radially, thus making possible a shorter machining time. In order to machine the workpiece tooth system over its entire width, the tool tooth system must closely conform to the workpiece tooth system, which causes certain problems during the tool manufacture.

The mentioned disadvantages can be reduced or avoided, if work is done according to the so called diagonal method. The tool is thereby moved relative to the workpiece in a direction which extends inclined with respect to the workpiece axis. Depending on the width of the tool and the angle with respect to the workpiece axis, which angle is chosen for the feed direction, a relatively short feed path may possibly already be sufficient in order to move the point of engagement and also the common normal from one face of the workpiece tooth system over the tooth width to the other face. It is therefore of particular importance to choose the width of the tool in dependency from the method parameters.

The basic purpose of the invention is therefore to further develop the known method so that it can be carried out with a feed path which is as short as possible.

A further basic purpose of the invention is to improve the described tool so that it permits a feed path which is as short as possible during use with the diagonal method.

The German Book "Hurth, Zahnradschaben", Pages 210/211 discloses geometrical relationships between tool width, workpiece gear width, crossed-axes angle and diagonal angle for the finishing of the tooth flanks of non-hardened gears, which finishing is carried out according to the diagonal method, which, however, cannot be applied to methods which work with abrasive tools. One can take from the German book that the finishing gear is narrower than the workpiece gear. From this results that the mesh between the tool and workpiece gear does not take place over the entire tooth width of the workpiece gear. If machining is thereby done with a diagonal feed, then the hard-material granules, in a tool with abrasive tooth flanks, have the tendency in the area of the tooth edges "to bury" themselves increasingly into the tooth flanks of the workpiece gear teeth. This results, in this area, in a nonclean tooth flank surface and a premature breakdown of the tool due to a breaking off of the hard-material granules.

The geometrical relationships which are discussed below permit among others in a surprising manner a checking of whether for example an existing tool is suited for a given machining case with the least possible feed path without the feed path (2·s) itself being included in this check. If the tool can be used, then the necessary feed path (2·s) can be determined in just as simple a manner from the formula $$2 \cdot s = b_w \cdot \frac{\sin\phi}{\sin(\epsilon + \phi)} \quad (1)$$

derived from the triangle calculation.

The dependency of the tool width from the method parameters has special significance. If a tool, for example an existing tool with a width which is larger than indicted is used, then the width is not fully utilized. If a larger tool would first have to be manufactured, unnecessary extra expenses for the tool would result. Whereas, if the width of the tool is smaller than has been disclosed below, then the tooth flanks of the workpiece gear are not machined over the entire width unless the feed path would be extended accordingly, which, however in particular is supposed to be avoided.

The inventive tool is suited for use in precision-working methods, which utilize a two-flank contact, as well as for those, which utilize a one-flank contact.

BRIEF DESCRIPTION OF THE DRAWINGS

The invention will be discussed hereinbelow with reference to three figures.

In the drawings.

DETAILED DESCRIPTION

Figure 1:
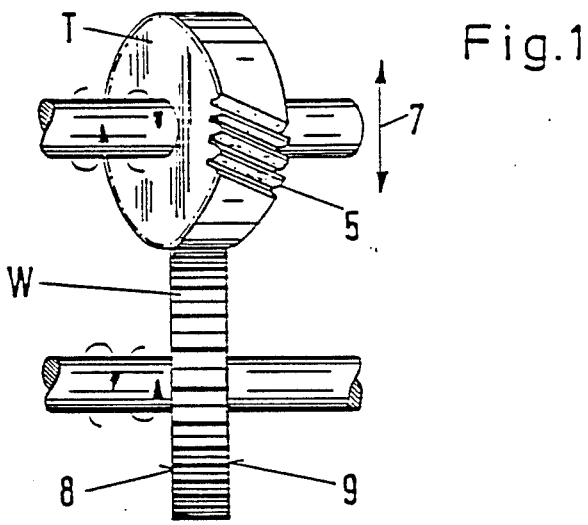
FIG. 1 is a side view of a tool in engagement with a workpiece gear.
Figure 2:
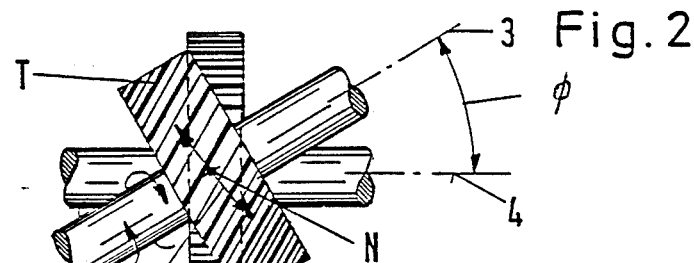
FIG. 2 is a top view of the tool with the workpiece gear.

A gear-like tool T having an axis of rotation 3 engages a gear (workpiece gear W) which is to be machined and having an axis of rotation 4 with crossed axes. The tool T has at least on the flanks of its teeth an abrasive surface, that is, a surface which does not have any uniformly directed cutting edges. If gears which are not yet hardened are to be machined, the tool T can be made totally of ceramic or synthetic resin with cutting granules embedded therein. However, the tool T here consists of a toothed metallic base member, the tooth flanks 5 of which are coated with hard material granules, for example of a cubic boron nitride (CBN) or diamond, if it is to primarily machine hardened gears. This method is identified as hard finishing or finish grinding. The workpiece gear W or the tool T is rotated for this purpose, the respective other part is co-rotated through the tooth systems. The tool T is, during rotation, moved back and forth in the direction of arrow 6 relative to the workpiece gear W. This feed movement occurs in a plane which lies parallel to the axes 3, 4. Aside from the feed movement 6, there intermittently occurs a radial feed in the direction of arrow 7 and at least one change in the direction of rotation. Between the tool T and the workpiece gear W there theoretically exists a point contact at a point of engagement N, which lies on the so called common normal, namely, an imaginary, mutually perpendicular connecting line extending between the axes 3, 4. The point of engagement N changes during the feed movement its position between the axially facing sides 8, 9 of the workpiece gear W, that is, it wanders from the one extreme position M at the one side 8 through the illustrated center position N to the other extreme position O at the other side 9. In order for this to be possible with a feed path which is as short as possible, attention must be paid to very specific relationships.

It has been found that between the optimum width of the tool T and other parameters defining the relative position and movement between T and workpiece gear W, the relationship $$b_T \geq b_w \left[ 2 \cdot \cos \phi - \frac{\sin \epsilon}{\sin (\epsilon + \phi)} \right] \quad (2)$$

is to be satisfied. In this formula, $b_T$ identifies the width of the tool T, $b_w$ identifies the width of the workpiece gear W, $\phi$ identifies the crossed-axes angle between the axes 3 and 4, and $\epsilon$ identifies the diagonal angle, that is, the angle between the axis 4 and the feed direction 6.

Figure 3:
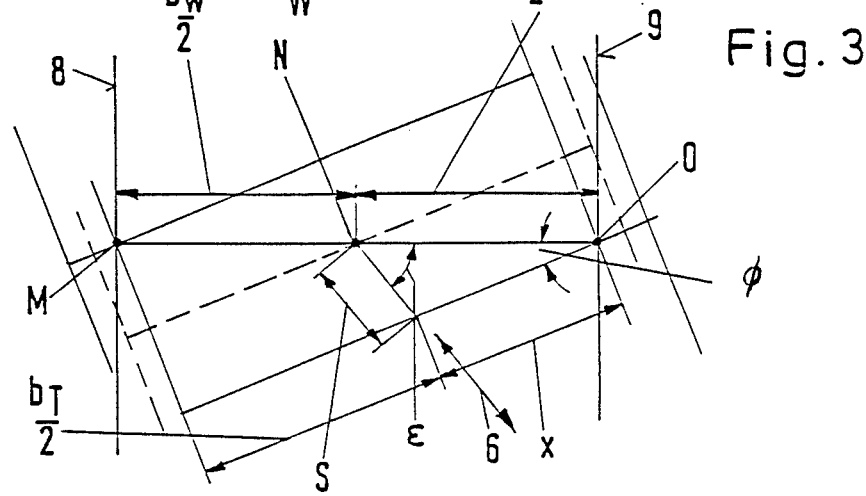
FIG. 3 illustrates the situation of FIG. 2 in an enlarged illustration and much simplified with various positions of the tool.

These parameters are illustrated in FIG. 3 for a better understanding. Furthermore, the distance on the feed path, which must be covered in order to move the point of engagement from the center position N to the extreme position O, is identified by the character s, and the right section of $b_T/2$, which still overlaps the workpiece gear W (seen from above), is identified by the character x.

The devices, in which the tool and the workpiece gear are received, were not illustrated in the figures, since they are of no significance for an understanding of the invention. The same is true for the drive mechanisms and for the machine on which the inventive method is carried out and also with which the workpiece gear W is machined with the inventive tool T.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method for working tooth flanks of a hardened workpiece gear using a gear-shaped tool (T) having an abrasive surface on its tooth flanks, wherein the surface is free of geometrically defined cutting edges, moving said workpiece gear and said tool relative to each other in rolling contact and in mesh at a crossed-axes angle, wherein between said workpiece gear and said tool there is carried out a relative feed movement in a plane parallel to the axes of said workpiece gear and said tool at an angle ($\epsilon$) with respect to the workpiece gear axis, said feed movement being carried out at an angle $\epsilon > 0°$ (diagonal feed), and wherein said tool is verified as having a width $b_T$ which satisfies the following relationship:

$$b_T \geq b_w \left[ 2 \cdot \cos \phi - \frac{\sin \epsilon}{\sin (\epsilon + \phi)} \right]$$

with $b_w$ representing the width of said workpiece gear which is to be machined, with $\phi$ identifying the crossed-axes angle between said tool axis and said workpiece gear axis and $\epsilon$ identifying the angle between the workpiece axis and the feed direction of said tool relative to said workpiece gear.

2. A gear-shaped tool for the precision working of the tooth flanks of a hardened workpiece gear wherein the axes of the gear-shaped tool and the workpiece gear are crossed at an angle greater than zero which tool has an abrasive surface on its tooth flanks, wherein the surface is free of uniformly directed cutting edges and comprises a coating of hard abrasive granules, wherein said tool has a width $b_T$ which, relative to the width $b_w$ of said workpiece to be machined satisfies the relationship $$b_T \geq b_w \left[ 2 \cdot \cos \phi - \frac{\sin \epsilon}{\sin (\epsilon + \phi)} \right]$$

with $\phi$ identifying the crossed-axes angle between said tool and said workpiece gear and $\epsilon$ identifying the angle between an workpiece axis and a feed direction of said tool relative to said workpiece gear.

* * * * *